United States Patent
Fang et al.

(10) Patent No.: US 10,564,814 B2
(45) Date of Patent: Feb. 18, 2020

(54) CONTEXTUAL NEW TAB EXPERIENCE IN A HETEROGENEOUS TAB ENVIRONMENT

(71) Applicant: Microsoft Technology Licensing, LLC, Redmond, WA (US)

(72) Inventors: Richard Fang, Bellevue, WA (US); Ross N. Luengen, Sammamish, WA (US); Scott James Krieder, Kirkland, WA (US); Michael John Patten, Sammamish, WA (US); Robyn Elizabeth Dunn, Seattle, WA (US); Brian Eric Uphoff, Seattle, WA (US); Christopher Doan, Seattle, WA (US); Darren Christopher Laybourn, Bellevue, WA (US); Phoi Heng Lew, Mill Creek, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/491,781

(22) Filed: Apr. 19, 2017

(65) Prior Publication Data
US 2018/0307390 A1    Oct. 25, 2018

(51) Int. Cl.
*G06F 3/0483* (2013.01)
*G06F 3/0482* (2013.01)

(52) U.S. Cl.
CPC .......... *G06F 3/0483* (2013.01); *G06F 3/0482* (2013.01)

(58) Field of Classification Search
CPC .................... G06F 3/0482; G06F 3/0483
See application file for complete search history.

(56) References Cited

U.S. PATENT DOCUMENTS

| | | | |
|---|---|---|---|
| 7,747,626 B2 | 6/2010 | Grimm et al. | |
| 8,386,955 B1 | 2/2013 | Weber et al. | |
| 8,713,444 B2 | 4/2014 | Sauve et al. | |
| 8,799,243 B1 * | 8/2014 | Havlik | G06Q 10/0631 |
| | | | 707/694 |
| 9,110,568 B2 * | 8/2015 | Jitkoff | G06F 3/0483 |
| 9,158,827 B1 * | 10/2015 | Vu | G06F 16/254 |
| 9,213,775 B2 | 12/2015 | Tseng | |
| 9,430,124 B2 | 8/2016 | Schreiner et al. | |
| 10,318,338 B2 * | 6/2019 | DeLuca | G06F 9/461 |
| 2002/0138389 A1 * | 9/2002 | Martone | G06Q 10/10 |
| | | | 705/36 R |

(Continued)

OTHER PUBLICATIONS

"International Search Report and Written Opinion Issued in PCT Application No. PCT/US2017/048520", dated Jan. 17, 2018, 12 Pages.

(Continued)

*Primary Examiner* — William L Bashore
*Assistant Examiner* — Nathan K Shrewsbury

(57) ABSTRACT

Techniques for a contextual new tab experience in a heterogeneous tab environment are described. In at least some implementations, relevant content associated with a user's current task is determined based on contextual information collected from tabs presented in a heterogeneous tab environment. According to various implementations, a new tab is launched displaying the relevant content in the heterogeneous tab environment. Thus, contextually relevant content can be determined from a current task and displayed in a single location via a heterogeneous tab environment.

20 Claims, 9 Drawing Sheets

(56) References Cited

U.S. PATENT DOCUMENTS

| | | | |
|---|---|---|---|
| 2004/0230594 A1* | 11/2004 | Flam | G06Q 10/10 |
| 2008/0125180 A1* | 5/2008 | Hoffman | G06F 3/0482 455/566 |
| 2009/0119587 A1* | 5/2009 | Allen | G06F 3/038 715/705 |
| 2009/0249339 A1* | 10/2009 | Larsson | G06F 9/451 718/100 |
| 2009/0288033 A1* | 11/2009 | Van Valkenburgh | G06F 3/0482 715/777 |
| 2010/0070928 A1 | 3/2010 | Goodger et al. | |
| 2011/0225232 A1* | 9/2011 | Casalaina | H04L 41/22 709/203 |
| 2012/0079413 A1* | 3/2012 | Bekelman | G06F 3/0482 715/777 |
| 2012/0159375 A1* | 6/2012 | Shaw | G06F 3/0483 715/777 |
| 2013/0159907 A1* | 6/2013 | Brosche | G06Q 10/06 715/771 |
| 2013/0167156 A1* | 6/2013 | Ressler | G06F 9/542 719/313 |
| 2013/0219260 A1* | 8/2013 | Hirokawa | G06F 3/1285 715/234 |
| 2013/0332830 A1* | 12/2013 | Ciurdar | G11B 27/34 715/719 |
| 2014/0089822 A1* | 3/2014 | Wu | G06Q 10/06 715/761 |
| 2014/0173497 A1* | 6/2014 | Schreiner | G06F 3/0483 715/777 |
| 2015/0058318 A1* | 2/2015 | Blackwell | G06F 17/30554 707/722 |
| 2015/0212670 A1 | 7/2015 | Chang et al. | |
| 2015/0331717 A1* | 11/2015 | Boenisch | G06F 9/48 718/107 |
| 2015/0378600 A1* | 12/2015 | Sloan | G06F 3/0482 715/773 |
| 2016/0077685 A1* | 3/2016 | Fang | G06F 9/452 715/778 |
| 2016/0085388 A1* | 3/2016 | Fang | G06F 16/185 715/778 |
| 2016/0103573 A1* | 4/2016 | Jones | G06F 3/0483 715/777 |
| 2016/0103793 A1* | 4/2016 | Fang | G06F 17/30896 715/234 |
| 2016/0124595 A1* | 5/2016 | Kim | G06F 3/0482 715/769 |
| 2016/0132201 A1* | 5/2016 | Shaw | G06F 3/04842 715/777 |
| 2016/0170592 A1 | 6/2016 | Deluca et al. | |
| 2016/0232137 A1* | 8/2016 | Liu | G06F 17/2235 |
| 2017/0139880 A1* | 5/2017 | Agostino | G06F 17/2235 |
| 2017/0293419 A1* | 10/2017 | Dipin | G06F 3/0483 |
| 2017/0351646 A1* | 12/2017 | White | G06F 3/04812 |
| 2018/0121038 A1* | 5/2018 | Bliss | G06F 3/04817 |
| 2018/0307390 A1* | 10/2018 | Fang | G06F 16/957 |
| 2018/0307525 A1* | 10/2018 | Gates | G06F 3/0483 |

OTHER PUBLICATIONS

Brinkmann, Martin, "Mozilla adds Suggested Sites feature to New Tab Page", http://www.ghacks.net/2015/05/15/mozilla-adds-suggested-sites-feature-to-new-tab-page/, May 15, 2015, 13 pages.

"Multitask with windows & tabs", https://support.google.com/chromebook/answer/177891?hl=en, Nov. 17, 2015, 2 pages.

Basu, Saikat, "Easily View Multiple Tabs At Once With These Chrome Extensions", http://www.makeuseof.com/tag/easily-view-multiple-tabs-at-once-with-these-chrome-extensions/, Oct. 2, 2013, 9 pages.

* cited by examiner

CONTEXTUAL NEW TAB EXPERIENCE IN A HETEROGENEOUS TAB ENVIRONMENT

BACKGROUND

Conventional tab environments, such as browsers, typically permit users to view or interact with application content through different respective tabs. For example, a user browsing the Internet may open different webpages by using different respective tabs of a browser. Enabling contextually relevant launch points for content in a new tab generally requires explicit user setup, such as via user selection of preferred content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for a contextual new tab experience in a heterogeneous tab environment are described. In at least some implementations, relevant content associated with a user's current task is determined based on contextual information collected from tabs presented in a heterogeneous tab environment. According to various implementations, a new tab is launched displaying the relevant content in the heterogeneous tab environment. Thus, contextually relevant content can be determined from a current task and displayed in a single location via a heterogeneous tab environment.

DETAILED DESCRIPTION

Implementations discussed herein provide a contextual new tab experience in a heterogeneous tab environment. The environment, for instance, enables contextually relevant content for a current task to be presented in a new tab of a heterogeneous tab environment. For example, contextual information can be collected from tabs currently open in the heterogeneous tab environment, and a present task may be inferred from the contextual information. Responsive to receiving a request to launch a new tab, relevant content can be determined based on the present task and presented in the new tab. Selection of the relevant content can cause the selected content to be displayed in the new tab.

Techniques described herein enable contextual information to be collected from disparate sources. For instance, contextual information can be collected from a heterogeneous tab environment itself and/or from applications executed in the environment through calls to application programming interfaces (APIs). Additionally or alternatively, contextual information may be collected from a user profile, a task database, and/or network sources, to name a few examples.

According to various implementations, contextual new tab experiences described herein allow for a convenient launch point for content likely to be accessed by a user in progressing a current task in which the user is engaged. Further, contextual new tab experiences further simplify a heterogeneous tab environment by not requiring a user to provide express input to progress a current task. Thus, a contextual new tab experience in a heterogeneous tab environment provides a single, intuitive shell for interacting with heterogeneously-sourced content to accomplish a given task.

Having presented an overview of techniques for a contextual new tab experience in a heterogeneous tab environment, consider now an example environment in which techniques described herein may be implemented.

Figure 1:
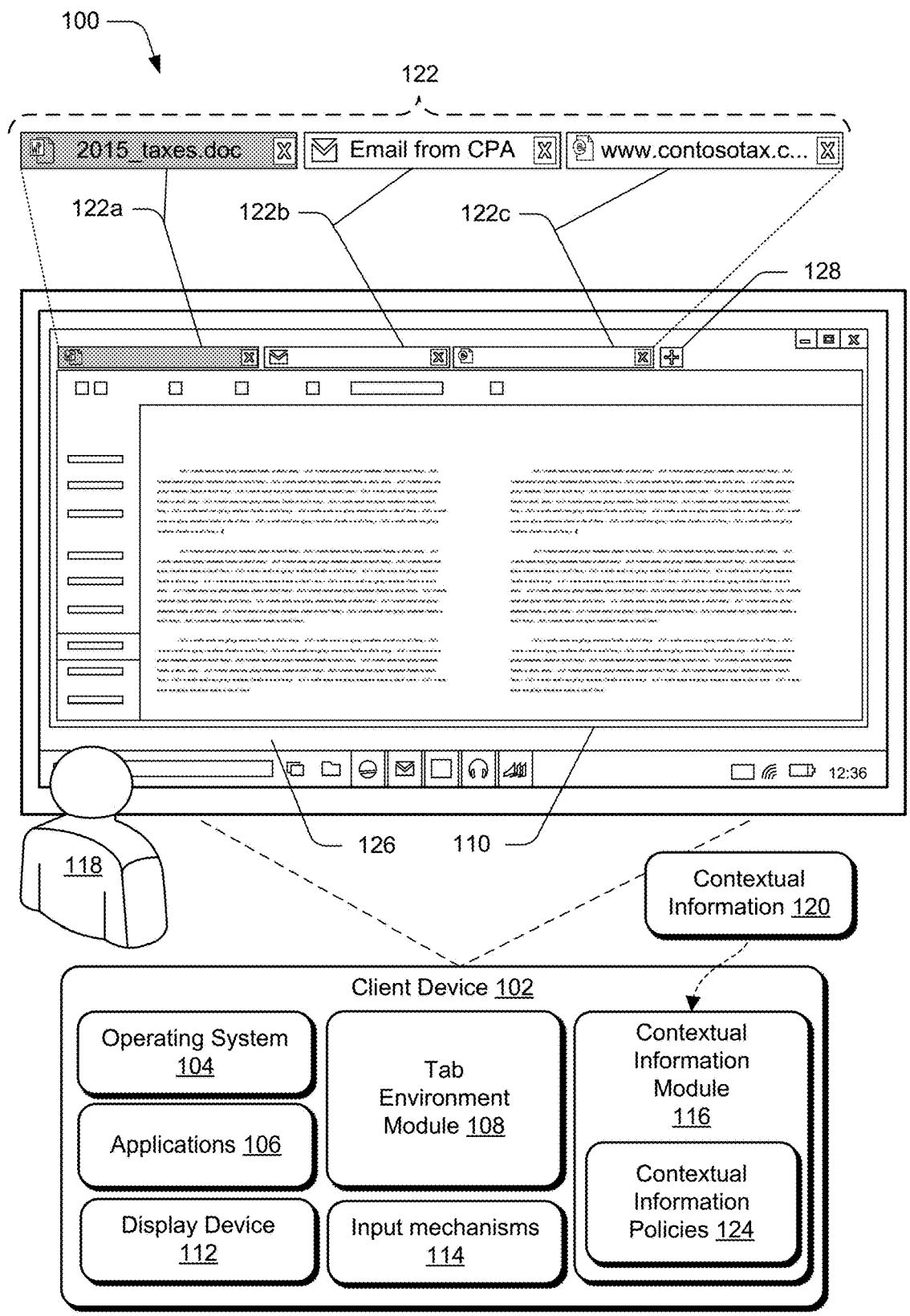
FIG. 1 is an illustration of an environment in an example implementation that is operable to employ techniques discussed herein.

FIG. 1 is an illustration of an environment 100 in an example implementation that is operable to employ techniques for a contextual new tab experience in a heterogeneous tab environment discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of the client device 102 is shown and described below in FIG. 9.

The client device 102 includes a variety of different functionalities that enable various activities and tasks to be performed. For instance, the client device 102 includes an operating system 104 and applications 106. Generally, the operating system 104 is representative of functionality for abstracting various system components of the client device 102, such as hardware, kernel-level modules and services, and so forth. The operating system 104, for instance, can abstract various components of the client device 102 to the applications 106 to enable interaction between the components and the applications 106.

The applications 106 represent functionalities for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The client device 102 further includes a tab environment module 108, which is representative of functionality for presenting a tab environment 110 capable of integrating content from heterogeneous sources into a single interactive interface. Generally, content may take a variety of forms, such as various combinations of the applications 106, services, text, multi-media streams, documents, application files, photos, audio/video files, animations, images, web pages, web applications, content for display by a browser or other client application, data structures, self-executing content, local content, remote content, application interfaces for the applications 106, and so forth. As further detailed below, the tab environment module 108 is configured to manage launching and execution of the applications 106 and other content in a heterogeneous tab environment.

The client device 102 further includes a display device 112 and input mechanisms 114. The display device 112 generally represents functionality for visual output for the client device 102. Additionally, the display device 112 represents functionality for receiving various types of input, such as touch input, pen input, and so forth.

The input mechanisms 114 represent different functionalities for receiving input to the client device 102. Examples of the input mechanisms 114 include touch input devices, touchless input devices, gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 114 may be separate or integral with the display device 112; integral examples include gesture-sensitive displays with integrated touch-sensitive or motion-sensitive sensors. The client device 102 further includes a contextual information module 116.

The contextual information module 116 is representative of functionality to perform various tasks pertaining to techniques for a contextual new tab experience discussed herein. The contextual information module 116, for instance, can be leveraged to manage interactions for a user 118 and the tab environment 110. For example, the contextual information module 116 collects, aggregates, and/or processes contextual information 120 for the user 118 and/or the tab environment 110 to enable contextual new tab experiences. Various attributes and operational aspects of the contextual information module 116 are detailed below.

In implementations, the contextual information module 116 can manage, control, and/or interact with the operating system 104 or the tab environment module 108 of the client device 102 to enable the techniques for a contextual new tab experience described herein. The contextual information module 116, for example, may provide selective modification to a user experience ("UX") based on the contextual information 120.

According to various implementations, the contextual information 120 represents data that corresponds to information about content and metadata associated with the content, such as metadata regarding the user 118, activities in the tab environment 110, types of content, dates associated with creating or modifying content, and so forth. In some cases, the contextual information 120 indicates a state of content and/or a state of a workflow related to the content. For example, the contextual information 120 regarding a workflow state for a word processing document created by the user 118 could indicate that the document has been "sent to John for final review." In some implementations, the contextual information 120 can be aggregated in conjunction with an indication of a user action that can be initiated from the tab environment 110, such as viewing an image file, playing a song from a streaming service, or sharing a web page with other users.

According to various implementations, the contextual information 120 is aggregated and/or collected by the contextual information module 116. The contextual information module 116, for instance, collects the contextual information 120 associated with content currently presented in tabs 122 of the tab environment 110.

The contextual information module 116 maintains contextual information policies 124, which are representative of different sets of data that specify criteria (e.g., permissions, rules, and so forth) for collecting, aggregating, processing, and/or presenting the contextual information 120 for the user 118 and/or the tab environment 110. The contextual information module 116 can cause the tab environment module 108 to present relevant content in a new tab of the tab environment 110 based on the contextual information 120 collected aggregated, and/or processed, and in accordance with the contextual information policies 124. The contextual information policies 124, for instance, specify which content to collect, aggregate, and/or present, as well as how to configure content for presentation. Alternatively or additionally, the contextual information policies 124 are content and/or application-specific. For example, the contextual information policies 124 can specify certain types of content that are permitted to be presented to the user 118, and other types of content that are not permitted to be presented to the user 118. The contextual information policies 124 may specify privacy settings for the user 118 regarding collection and/or aggregation of the contextual information 120 related to the user 118. Generally, the contextual information policies 124 can be configured in various ways such as via default settings, settings specified by a user, by information technology (IT) personnel, by application development personnel, and so forth.

The environment 100 further includes an example snapshot of a graphical user interface ("GUI") 126 that can be output on the display device 112 by the tab environment module 108 to employ heterogeneous tab environment techniques described herein. By configuring the GUI 126 in the various ways described herein, the tab environment module 108 can employ techniques for presenting a heterogeneous tab environment that enable the user 118 to interact with content from heterogeneous sources in a single interface shell. According to various implementations, the GUI 126 can be implemented by the tab environment module 108 as an application and/or a UX and can be made available to devices associated with the user 118, such as the client device 102. Regardless of where the GUI 126 is used, the GUI 126 is generally representative of a location to promote quick and easy interaction with disparate tab content.

In at least some implementations, the tab environment module 108 can generate the tab environment 110 in which the user 118 can interact with tab instances of heterogeneous content, including one or more of the applications 106. As described herein, the tab environment 110 represents functional collection of interaction affordances that can be configured in various ways according to techniques for a heterogeneous tab environment described herein. Generally, the tab environment 110 generated by the tab environment module 108 can be useful in settings where the user 118 interacts with content from heterogeneous sources. The tab environment module 108 can integrate data from various sources to provide applications and/or services in a single interface, such as the tab environment 110.

As depicted in the environment 100, the tab environment 110 includes the tabs 122 (including a tab 122a, a tab 122b, and a tab 122c), each of which present different instances and/or types of content. Generally, the tabs 122 represent individual user interface frames presented within a single visual shell in the GUI 126 to enable quick and easy access to varied content via visual and selectable tabs in the shell. In this particular example, the left-most tab 122a is presenting word processing document '2015_taxes.doc' from a word processing application interface (e.g., one of the applications 106), the middle tab 122b is presenting an email entitled 'Email from CPA' from an email service interface, and the right-most tab 122c is presenting content of a browser application (e.g., one of the applications 106), which presents a web page 'www.contosotax.com' within the tab environment 110.

The tab environment 110 further includes a new tab control 128. The new tab control 128 is selectable to cause presentation by the tab environment module 108 of a new tab within the tab environment 110. The user 118, for instance, selects the new tab control 128 via the input mechanisms 114.

In at least some implementations, the tab environment 110 may be implemented as a desktop, virtual or otherwise, and include various controls via interactive elements, menus, and so forth. For example, the tab environment 110 may provide a user interface shell-based workspace in which the tabs 122 can be individually moved, sized, or selected. As noted above, the tabs 122 may include controls that enable the tabs 122 to be sized, positioned, minimized, closed, and so on.

In this environment, the user 118 represents a single user associated with the tab environment 110, but it will be appreciated that more than one user may interact with the tab environment 110 and/or the GUI 126.

Having described an example environment in which the techniques described herein may operate, consider now a discussion of some example implementation scenarios in accordance with one or more embodiments. The implementation scenarios may be implemented in the environment 100 discussed above, and/or any other suitable environment.

Figure 2:
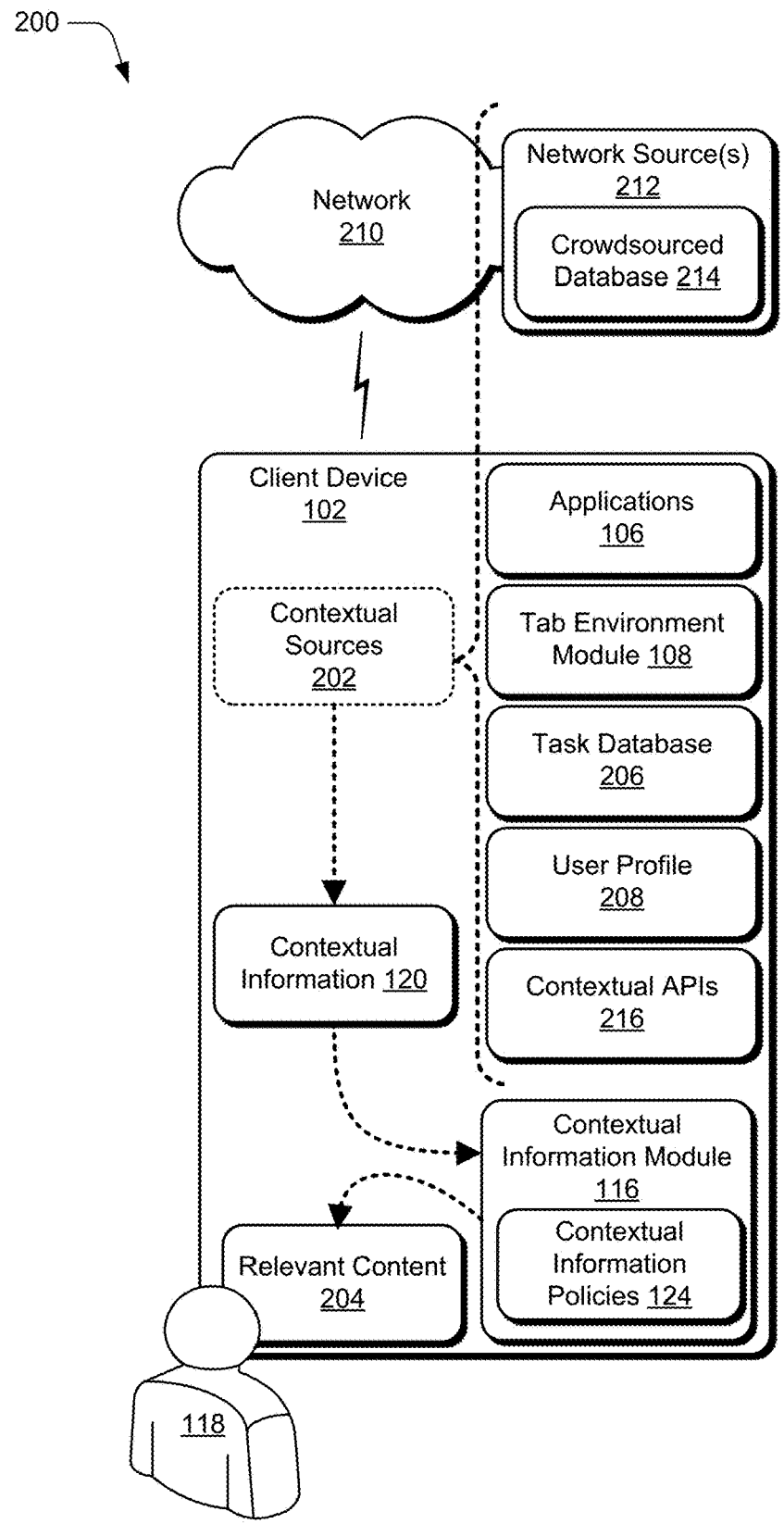
FIG. 2 depicts an example implementation scenario for collecting contextual information in accordance with one or more embodiments.

FIG. 2 depicts an example implementation scenario 200 for collecting contextual information for a heterogeneous tab environment in accordance with one or more implementations. The scenario 200 includes various entities and components introduced above with reference to the environment 100.

The scenario 200 illustrates that the contextual information module 116 of the client device 102 receives the contextual information 120 from contextual sources 202 and leverages the contextual information 120 to determine relevant content 204 for progression of a present task of the user 118. In this particular example, the contextual sources 202 include the applications 106, the tab environment module 108, a task database 206, and a user profile 208. Generally, the contextual sources 202 may be implemented locally and remotely from the client device 102. As an example, the contextual sources 202 may be accessed over a network 210, such as from network sources 212 which in this example include a crowdsourced database 214. The preceding examples of the contextual sources 202 should be understood to be examples and not limiting on the claimed implementations. It should therefore be understood that any source which may contribute to the contextual relevance of content presented in a new tab of a tab environment (e.g., the tab environment 110 of FIG. 1) may be considered to be an instance of the contextual sources 202.

The network 210 is representative of a network that provides the client device 102 with connectivity to various networks and/or services, such as the Internet. The network 210 may provide the client device 102 with connectivity via a variety of different connectivity technologies, such as broadband cable, digital subscriber line (DSL), wireless cellular, wireless data connectivity (e.g., WiFi™) T-carrier (e.g., T1), Ethernet, and so forth. In at least some implementations, the network 210 represents different interconnected wired and wireless networks. The network 210 may be implemented in various ways, such as a local access network (LAN), a wide area network (WAN), the Internet, and so forth.

The network sources 212 are generally representative of a network-based functionality for providing data and services to the client device 102 over the network 210. For instance, one or more of the contextual sources 202 may be located remotely from the client device 102 and thus the functionality of one or more of the contextual sources 202 may be provided by, or in conjunction with, the network sources 212.

In various implementations, the contextual information module 116 collects at least part of the contextual information 120 from the task database 206. Generally, the task database 206 represents a set of data regarding prior activity identified as a task. The task database 206 may include environmental awareness data such as date, time, location (e.g., user and/or device geographic location), device type, and so forth, as such data is associated with tasks. For instance, tasks identified in the task database 206 may be based, either explicitly or implicitly, on prior concurrent access of content by the user 118 and/or by other users. As an example, the task database 206 stores a data set indicating that when a word processing document is open which contains content related to volcanoes, and a slideshow document is concurrently open, that the present task is most likely an academic presentation on the topic of volcanoes. Thus, in the example, the contextual information module 116 determined that content related to researching volcanoes, for instance a web page about famous volcanic eruptions, is most relevant to the context, e.g., the task.

As another example, the task database 206 stores a data set indicating that when a map application indicates that the client device is located in downtown Seattle, and a hotel webpage is concurrently open, that the present task most likely involves navigation to a hotel in downtown Seattle. Based on this contextual information, the contextual information module 116 determines that content related to bus schedules for downtown Seattle, such as a web page presenting public transit options from the current location, is most relevant to the context, e.g., the task. In this way, the contextual information module 116 may more accurately determine relevant content 204 for progressing to a likely subsequent step in the present task of the user 118, as described below. While the task database 206 is depicted in this scenario as being implemented on the client device 102, it should be understood that the task database 206 may be implemented over the network 210, e.g., via the network sources 212, as described above. According to various implementations, various functionalities of the task database 206 may be implemented via the network sources 212 as the crowdsourced database 214, as described below.

In various implementations, the contextual information module 116 collects at least part of the contextual information 120 from the crowdsourced database 214. Generally, the crowdsourced database 214 represents information related to tendencies, behaviors, and actions of users other than the user 118 in the context of tabbed heterogeneous environments. In some implementations, the crowdsourced database 214 may include de-identified metadata and/or behavioral patterns collected by a service provider from a relevant user base including a variety of different users and a variety of different devices. For instance, a service provider collects metadata from their user base including information about when their users open a new application or tab and what contextual indications are presented when doing so. By collecting the contextual information 120 of the type described in the example, e.g., from the crowdsourced database 214, the contextual information module 116 may be able to determine content relevant to the present task of the user 118 based on the actions of other users in a similar context. While the crowdsourced database 214 is depicted here as a network source 210, it is to be appreciated that the crowdsourced database 214 may alternatively or additionally be implemented locally on the client device 102.

Consider an example where the crowdsourced database 214 indicates that when a word processing document is accessed, the most commonly launched type of application subsequent is a spreadsheet application. In the example, the crowdsourced database 214 includes data collected from a service provider's user base. As such, if the user 118 interacts with a word processing document (such as the content of the tab 122a of FIG. 1), the contextual information module 116 determines that a spreadsheet application is likely to be the next tab launched by the user 118. Thus, the contextual information module 116 uses the contextual information 120 to identify a task in which the user 118 is engaged and may determine the relevant content 204 for progressing to a likely subsequent step in the task, as described below.

In various implementations, the contextual information module 116 collects at least some of the contextual information 120 from the tab environment module 108. For instance, the contextual information module 116 collects the contextual information 120 related to content and metadata from tabs currently presented to the user 118, e.g., the tabs 122 in the tab environment 110 of FIG. 1. The contextual information 120 obtained from the currently presented tabs may indicate a task in which the user 118 is presently engaged. In this way, the contextual information module 116 may acquire information enabling a determination of the relevant content 204 for progressing to a likely subsequent step in the present task of the user 118, as described below.

In various implementations, the contextual information module 116 collects at least part of the contextual information 120 via the applications 106. For instance, the contextual information 120 collected from the applications 106 may be collected by calling contextual application programming interfaces (APIs) 216. For example, the contextual APIs 216 enable various aspects of techniques for collecting the contextual information 120 discussed herein. The contextual APIs 216, for instance, may be called by the tab environment module 108 and/or the contextual information module 116 to retrieve the contextual information 120 related to the applications 106, their content, and/or their metadata. In this way, the contextual information module 116 can then tailor a new tab experience to the user 118 based on data handled by one or more of the applications 106, such as the applications 106 represented by the different tabs 122 in the tab environment 110 of FIG. 1. The contextual APIs 216 further allow app developers to integrate their applications into a heterogeneous tab environment, such as the tab environment 110 of FIG. 1, via the contextual APIs 216 with minimal processing load. For example, the contextual APIs 216 allow app developers to surface information from the applications 106 to the tab environment module 108 and/or the contextual information module 116 through the contextual APIs 216. This allows greater integration of the applications 106 with a heterogeneous tab environment, such as the tab environment 110.

In various implementations, the contextual information module 116 collects at least part of the contextual information 120 from the user profile 208. Generally, the user profile 208 includes data related to past and present activity and settings for the user 118. The contextual information module 116 utilizes the contextual information 120 from the user profile 208 to determine the present context for the user 118. The user profile 208 may also include environmental awareness data such as date, time, location, device type, and so forth, as well as data collected from devices other than the client device 102. In this way, the contextual information module 116 may collect the contextual information 120 specifically identifying past activities by the same user 118 in a similar context. As an example, consider that the user profile 208 contains data indicating that the user 118 previously interacted with a word processing document about taxes and an email about taxes and in that previous context the user 118 opened a spreadsheet application next. Thus, in the example, the contextual information module 116 may determine that the user 118 is likely to open a spreadsheet application as a likely subsequent step in progressing a present task based on the contextual information 120. As a result, the spreadsheet application is determined to be an instance of the relevant content 204. While the user profile 208 is depicted in this scenario as being implemented on the client device 102, it should be understood that the user profile 208 may be implemented over the network 210, e.g., via the network sources 212, as described above.

Further to the scenario 200, the contextual information module 116 determines the relevant content 204 for progressing to a next likely step of a present task of the user 118. In the scenario, the relevant content 204 is based on the contextual information 120 obtained by the contextual information module 116 in accordance with the contextual information policies 124. Generally, the relevant content 204 represents content that may be presented in a heterogeneous tab environment. According to various implementations, the contextual information module 116 determines the relevant content 204 for the user 118 to progress to a next likely step of a present task. Thus, the contextual information module 116 obtains the contextual information 120 to identify the present task of the user 118 and to determine the relevant content 204 for utilizing the heterogeneous tab environment to progress to the next step of the present task.

In some implementations, the contextual information module 116 determines a strength of correlation for different instances of the relevant content 204 relative to the contextual information 120 extracted for the tab environment 110 of FIG. 1. For instance, consider that the contextual information module 116 obtains the contextual information 120 from the tab environment module 108 pertaining to the content of the tabs 122 of the tab environment 110 of FIG. 1. Consider further that keyword analysis of the contextual information 120 indicates that the terms "tax" and "income" are the most common keywords encountered in the contextual information 120. Accordingly, the contextual information module 116 can determine which instances of the relevant content 204 include and/or pertain to the keywords "tax" and "income." Further, the contextual information module 116 can assign a strength of correlation value to each instance of the relevant content 204 that includes these keywords. In one example implementation, a statistical correlation value, such as an r value, is assigned to each instance of the relevant content 204 that includes one of more of these keywords. Thus, a collection of matching instances of the relevant content 204 can be ranked, such as in descending order of r values. Instances of the relevant content 204 with higher r values can be ranked higher than instances of the relevant content 204 with lower r values. Thus, instances of the relevant content 204 with higher r values can be designated as being more likely to be relevant to a subsequent next step for a task associated with the contextual information 120 than other instances of the relevant content 204 with lower r values.

The contextual information module 116 may additionally or alternatively calculate the similarity of a portion of the contextual information 120 that is not specific to the user 118 (e.g., the contextual information 120 provided by the crowdsourced database 214) and a portion of the contextual information 120 obtained from a user-specific source, e.g., the tab environment module 108. For instance, consider that analysis of the contextual information 120 provided by the tab environment module 108 indicates that the currently presented tabs (e.g., the tabs 122 of the tab environment 110 of FIG. 1) include a word processing application and a web browser application. Consider also that a portion of the contextual information 120 provided by the crowdsourced database 214 indicates that other users interacting with both a word processing application and a web browser application are most likely to subsequently open a spreadsheet application. Additionally, consider that the contextual information 120 provided by the crowdsourced database 214 indicates that opening a presentation application and a web browser search interface, are the second and third most likely subsequent steps in that context, respectively. Accordingly, the contextual information module 116 can determine which instances of the relevant content 204 include and/or pertain to the spreadsheet application, presentation application, and/or web browser search interface, for example. For instance, a statistical correlation value, such as an r value, is assigned to each instance of the contextual information 120 obtained from the crowdsourced database 214 relative to the contextual information 120 obtained from the tab environment module 108 to determine a weight to be assigned to each instance of the contextual information 120 in determining the relevant content 204. Thus, a collection of matching instances of the contextual information 120 obtained from the crowdsourced database 214 can be ranked, such as in descending order of r values. Instances of the contextual information 120 obtained from the crowdsourced database 214 with higher r values can be ranked higher than instances of the contextual information 120 obtained from the crowdsourced database 214 with lower r values. Thus, instances of the contextual information 120 obtained from the crowdsourced database 214 with higher r values can be designated as being more likely to be relevant to a subsequent next step for a task associated with the contextual information 120 obtained from the tab environment module 108 than other instances of the contextual information 120 obtained from the crowdsourced database 214 with lower r values.

In such a scenario, the contextual information module 116 uses the determined similarity to further determine whether and/or how to use the contextual information 120 that is not user-specific in determining the relevant content 204. For example, the contextual information module 116 can assign a strength of correlation value to each instance of the contextual information 120 obtained from the crowdsourced database 214 based on instances of the contextual information 120 obtained from another of the contextual sources 202, such as the user profile 208.

Figure 3:
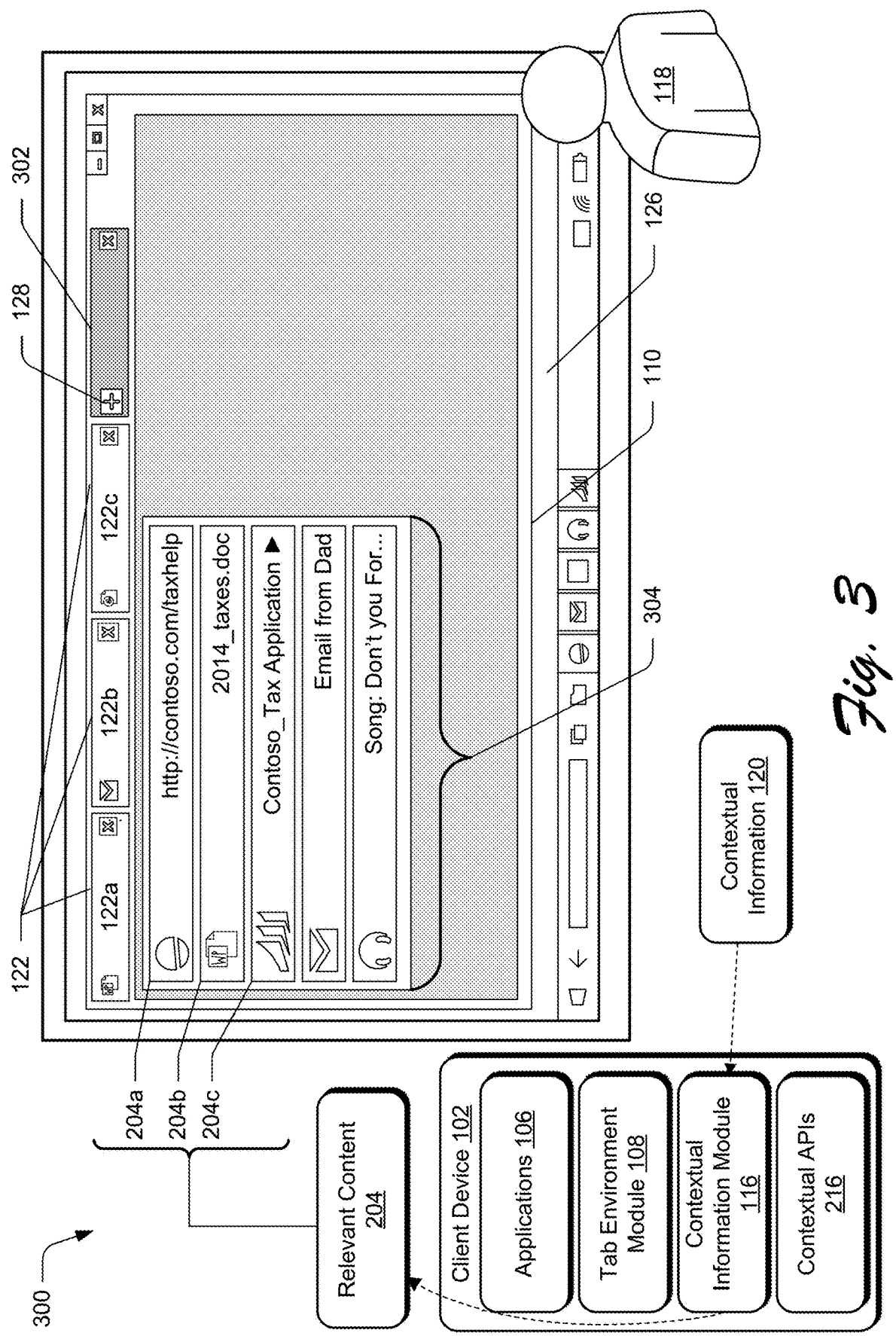
FIG. 3 depicts an example implementation scenario for presenting a contextual new tab experience in accordance with one or more embodiments.

FIG. 3 depicts an example implementation scenario for determining relevant content in accordance with one or more implementations. The scenario 300 includes various entities and components introduced above with reference to the environment 100 and the scenario 200.

In the scenario 300, the tab environment 110 is presented to the user 118 in the GUI 126. Consider, for example, that the user 118 is currently working with content of the tab 122a, i.e., the word processing document 2015_taxes.doc. The user 118 in this scenario wishes to add another tab within the tab environment 110 to present content from an application contextually related to the current task, filing taxes. To do so, the user 118 initiates an input via the new tab control 128 of the tab environment 110. In response to receiving a selection of the new tab control 128, the tab environment module 108 presents a new tab 302 configured to expose the relevant content 204, as determined by the contextual information module 116.

In some implementations, the contextual information module 116 provides the relevant content 204 to the tab environment module 108 to expose the relevant content 204 responsive to the tab environment module 108 receiving an input indicating a selection of the new tab control 128. The input to present the new tab 302 may include any suitable type of input, such as directional input or gesture input received via a control portion included in the tab environment 110. In some cases, the input is received via an access protocol to launch the new tab 302, such as a uniform resource locator (URL), a uniform resource indicator (URI), and so forth. Alternatively or additionally, the input is received via a file association configured to launch the new tab 302, such as a file type configured to launch as one of the applications 106, e.g., a ".doc" file. Generally, any suitable type of input may be utilized and recognized to generate the new tab 302.

The contextual information module 116 may obtain the contextual information 120 in various ways, as described above. For instance, the contextual information module 116 may collect the contextual information 120 from the tab environment module 108. The tab environment module 108, for example, calls the contextual APIs 216 and requests the contextual information 120 for the tabs 122. In response, the contextual APIs 216 return the contextual information 120 regarding content and metadata associated with the tabs 122 to the tab environment module 108 and/or the contextual information module 116.

Further to the scenario 300, the contextual information 120 collected by the contextual information module 116 includes the content of the tabs 122a, 122b, and 122c, generally related to tax preparation. For instance, the contextual APIs 216 respond to a request from the tab environment module 108 with the contextual information 120 relating to content that the user 118 is interacting with in the tabs 122a and 122c. Additionally or alternatively, the tab environment module 108 sends the contextual information 120 related to the content of the tabs 122 to the contextual information module 116.

Based on the contextual information 120, the contextual information module 116 determines that the user 118 is likely engaged in the task of tax preparation. The contextual information module 116 may determine the relevant content 204 in the context of the task of preparing taxes, such as based on keyword recognition of text within the contextual information 120. In this way, the contextual information module 116 enables the relevant content 204 to be exposed in the new tab 302 to provide the user 118 with a likely subsequent step in progression of the present task.

Consider another example where the user 118 is a student working on a school paper about Albert Einstein. In this scenario, the user 118 interacts with a word processing document, e.g., the school paper, in the tab environment 110. In response to a call from the contextual information module 116, the contextual APIs 216 send the contextual information 120 from the tabs 122 indicating to the contextual information module 116 that the user 118 is working with content relating to Albert Einstein, in this case a school paper. The contextual information module 116 then determines the next likely step in the task of writing a paper about Einstein. In this example, the next step in the task is determined by the contextual information module 116 to be researching Albert Einstein via a web browser application of the tab environment 110. Responsive to receiving an input selecting the new tab control 128, the contextual information module 116 causes search results from a web browser application to be presented in the new tab 302 as the relevant content 204. In this way, the contextual information module 116 creates a contextual new tab experience in the tab environment 110 for the user 118.

As an additional or alternative implementation, the contextual information module 116 causes a slide-based presentation template for school papers to be presented in the new tab 302 as the relevant content 204. As such, the applications 106 executable on the client device 102 and/or known to the contextual information module 116 are capable of numerous features and the techniques described herein enable contextual access in the tab environment 110 to these features.

Further to the scenario 300, the tab environment module 108 presents the relevant content 204 as visual representations 304 in the new tab 302. Generally, the visual representations 304 represent interactive controls selectable to cause presentation of the associated relevant content 204. The visual representations 304 may include text, icons, and/or reduced-sized images of the associated relevant content 204, such as thumbnail images. These reduced-sized images may visibly indicate a preview of the relevant content 204. In some cases, the visual representations 304 may be ordered or organized based on any suitable criteria, such as relevancy, most frequently used, and so forth. The relevant content 204 is depicted as a list in the scenario, but it should be understood that the relevant content 204 may be presented in a number of ways to facilitate access to contextual material through the tab environment 110. For example, the visual representations 304 may be presented in the new tab 302 as "suggestions" phrased in natural language. In another implementation, the relevant content 204 is presented as a menu list with check boxes to enable selective presentation of the relevant content 204 by the user 118.

In this instance, the relevant content 204 includes relevant content 204a, a web page 'contoso.com/taxhelp' presented in the new tab 302, relevant content 204b, a word processing document file '2014_taxes.doc' presented in the new tab 302, and relevant content 204c, an application 'Contoso_Tax Application' (such as the applications 106) presented in the new tab 302. Although a web page, application, and file are depicted as examples of the relevant content 204, it should be understood that such examples are not limiting and that the relevant content 204 may include other types of content, as described above.

In some implementations, the contextual information 120 includes a type and/or scenario of input received to launch the new tab 302 or to launch one of the tabs 122a, 122b, or 122c in the tab environment 110. Consider an example where the new tab 122c is launched from an input received via a URL in the tab 122b, which causes the tab 122c to launch. In the example, the contextual information 120 returned to the contextual information module 116 from the tab environment module 108 and/or the contextual APIs 216 includes information indicating that the tab 122c was launched responsive to input via an access protocol associated with the tab 122b. By obtaining the contextual information 120 related to the launch scenario of the tabs 122, the contextual information module 116 is able to determine the relevant content 204 in the context of implicit associations between the tabs 122 of the tab environment 110.

According to various implementations, the tabs 122a-122c are grouped as a tab group such that launching a new tab from one of the tabs 122a-122c will add the new tab to the tab group. In another example, a modified input can be provided that causes a new tab to launch in a new, separate tab group. A modified input, for example, can include a keyboard modifier (e.g., a ctrl key press) along with a selection of the new tab control 128. Various other modifiers may be employed, such a mouse right-click, gesture modifiers, and so forth. For instance, consider a scenario where modified input to launch the tab 122c is received from the tab 122b to launch the tab 122c. Further, a launch context includes a file type association. In a typical scenario, the tab 122c would launch as part of the same tab group with the tabs 122a, 122b. However, based on the modified input, the new tab 122c is launched as a new, different tab group. Regardless of the type and/or scenario of the input that causes the presentation of the tabs 122 and/or the new tab 302, the contextual information 120 may indicate the type and/or the scenario of the input and thus allow the contextual information module 116 to take the input into account when determining the relevant content 204.

According to various implementations, input indicating a hover action over the new tab control 128 causes the tab environment module 108 to present the new tab 302 or a preview of the new tab 302 as a pop-up element in the tab environment 110. Receiving additional input or cessation of the input while the pop-up element is presented may indicate a selection of one of the visual representations 304 or confirm a selection of the new tab control 128.

In this scenario, the tab environment 110 is illustrated as having three tabs currently presenting content (the tabs 122a, 122b, and 122c), but it should be understood that the tab environment 110 may include any number of tabs. Further, the new tab control 128 can be located proximate to title portions of existing tabs (such as the tabs 122), in a fixed position within the tab environment 110, and/or any other suitable location.

Figure 4:
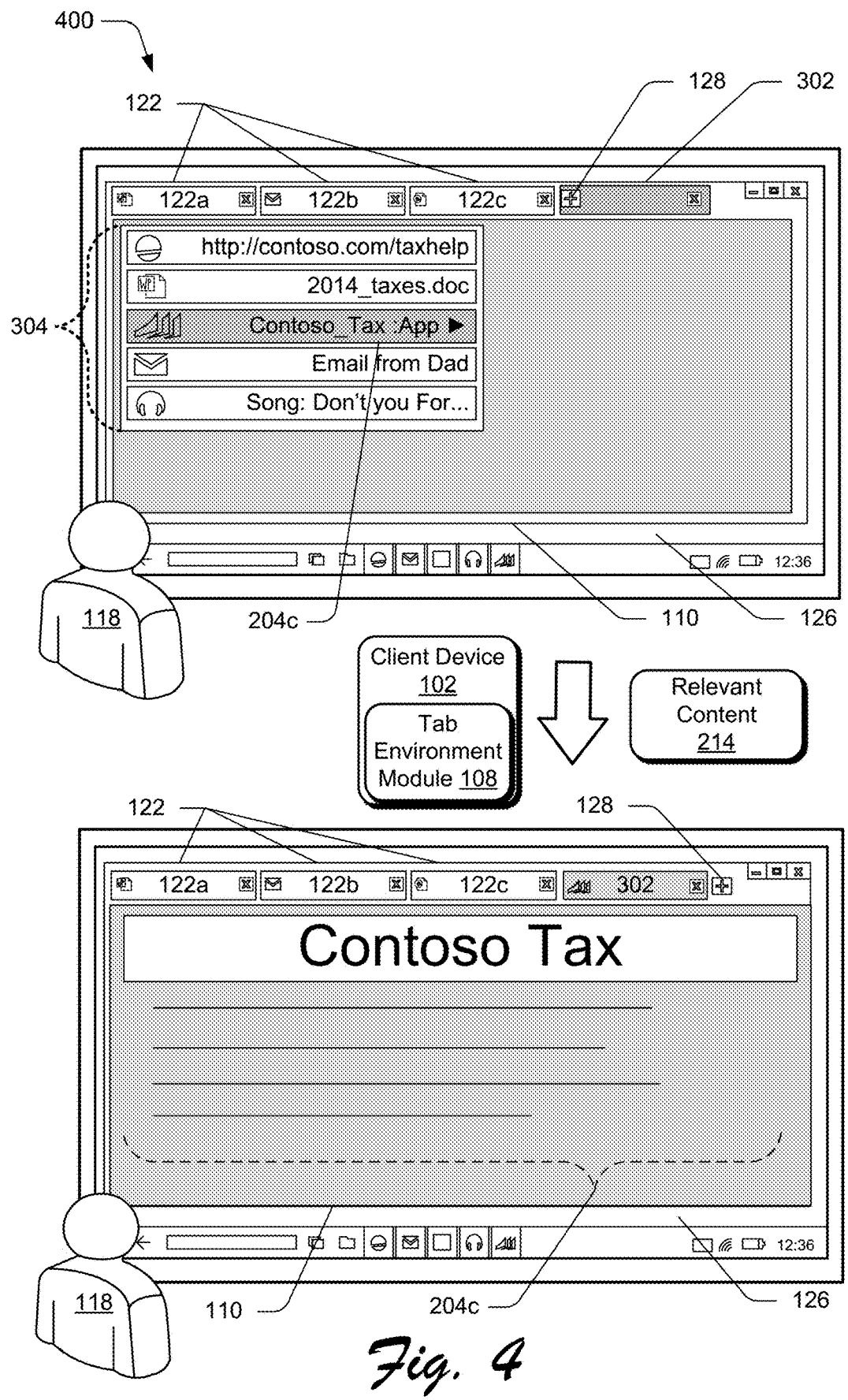
FIG. 4 depicts an example implementation scenario for presenting relevant content in a heterogeneous tab environment in accordance with one or more embodiments.

FIG. 4 depicts an example implementation scenario for a contextual new tab experience in accordance with one or more implementations. The scenario 400 includes various entities and components introduced above with reference to the environment 100 and the scenarios 200 and 300.

In the upper portion of the scenario 400, input selecting one of the instances of the relevant content 204 is received via a corresponding one of the visual representations 304. The input may include any suitable input, such as cursor input, gesture input, or touch input. Continuing the ongoing example, tap input is received via one of the visual representations 304 of the relevant content 204c.

Proceeding to the lower portion of the scenario 400, the tab environment module 108 causes the associated relevant content 204c to be populated to the new tab 302. In the example, the tab environment module 108 causes the Contoso_Tax App to be presented in the new tab 302 of the tab environment 110. According to various implementations, the new tab control 128 is presented proximate to the new tab 302 responsive to the selection of one of the visual representations 304 and the subsequent population of the selected relevant content 204 to the new tab 302, or responsive to content other than the relevant content 204 launching in the new tab 302.

In at least some implementations, the relevant content 204 presented in the new tab 302 is not immediately available for execution and/or presentation on the GUI 126 of the client device 102. For example, the relevant content 204c may not be installed on the client device 102 when the new tab 302 is presented. Accordingly, responsive to receiving the input selecting the relevant content 204c, the tab environment module 108 causes download and/or installation of the relevant content 204c for execution and/or presentation. Continuing the example, the relevant content 204c may be downloaded over the network 210 from the network sources 212 discussed with reference to FIG. 2, for instance. In some implementations, download and/or installation of content to enable presentation of the relevant content 204 may occur automatically in response to selection of the relevant content 204. In other implementations, download and/or installation of the relevant content 204 may occur responsive to explicit permission from the user 118. In such an instance, the tab environment module 108 may cause presentation of a prompt to the user 118 requesting permission to download and/or install the relevant content 204. The prompt could be presented as a pop-up shell in the tab environment 110.

Consider an example where the relevant content 204 is a movie available from a streaming service not accessible to the user 118. For instance, assume the relevant content 204 was determined by the contextual information module 116 of FIG. 3 to indicate viewing tendencies of the user 118. The streaming service is not available to the user 118 because the streaming service is subscription-based and the user 118 does not possess a subscription. An input indicating selection of the movie causes the tab environment module 108 to prompt the user 118. The prompt, for instance, includes subscription options for the streaming service to enable the user 118 to consume the relevant content 204, e.g., the movie. The user 118 selects a subscription option for the streaming service from the prompt and the tab environment module 108 presents the movie in the new tab 302 of the tab environment 110. While a subscription-based streaming service and movie are described in the above example, it should be understood that any type of relevant content, such as an application, service, and so forth, may be contemplated. Additionally, while the tab environment module 108 is depicted in the example, it should be understood that accessing the relevant content 204 that is not locally executable, e.g., subscription-based or not yet installed, may be accomplished in conjunction with or entirely by the operating system 104 of FIG. 1 and/or the network sources 212 of FIG. 2.

Further to the above described scenario where the relevant content 204 is a movie available from a streaming service, consider an alternative or additional implementation where a codec required to present the movie in the new tab 302 is not installed locally on the client device 102. In such an instance, the codec may be automatically downloaded and/or installed on the client device 102 responsive to the presentation of the visual representations 304 of the relevant content 204. In another implementation, the user 118 may be prompted prior to downloading or installing the codec on the client device 102.

Having discussed some example implementation scenarios, consider now a discussion of some example procedures in accordance with one or more embodiments. The example procedures may be employed in the environment 100 of FIG. 1, the system 900 of FIG. 9, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102), at a network-based service, and/or via cooperation between the client device 102 and a network-based service.

Figure 5:
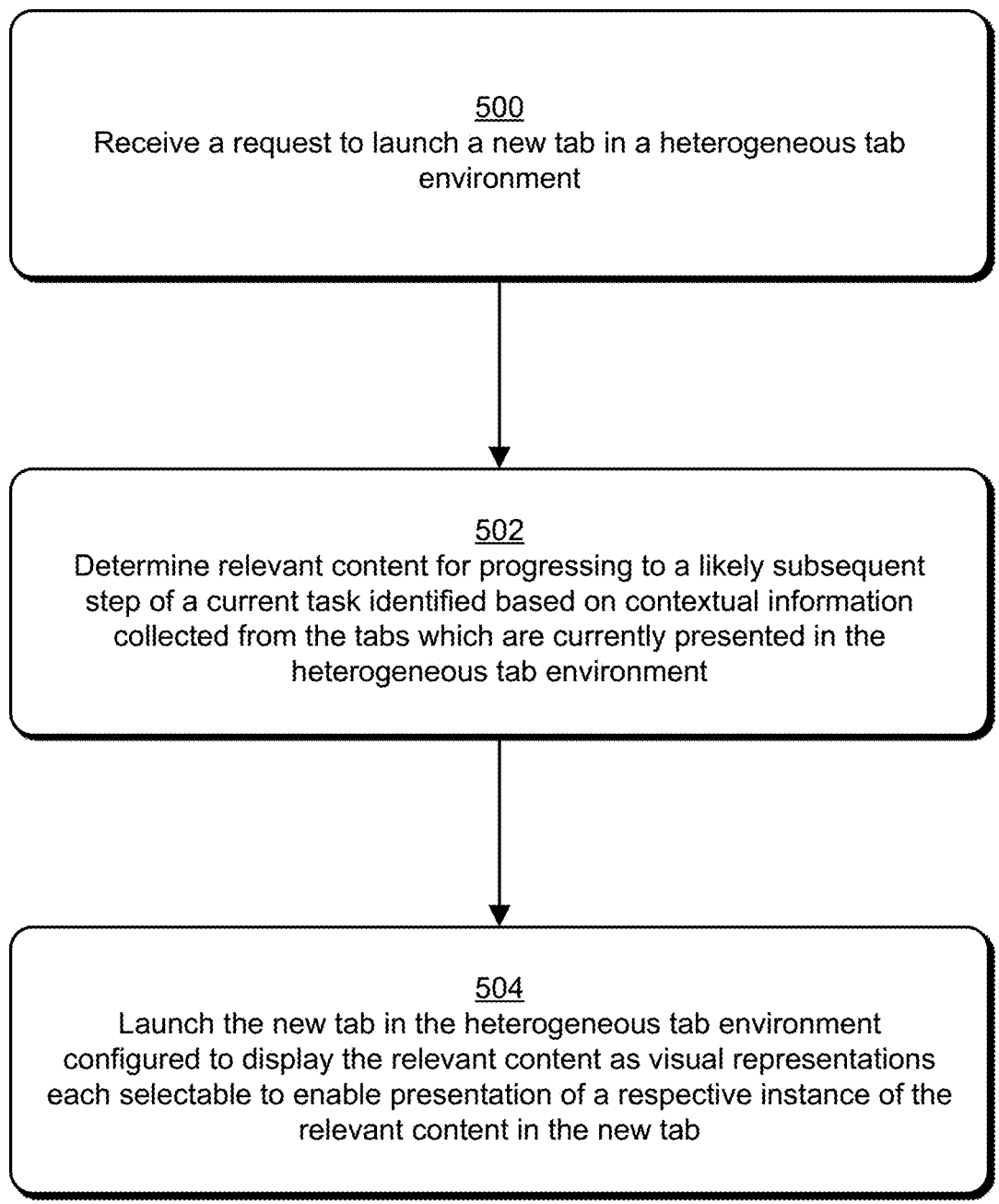
FIG. 5 is a flow diagram that describes steps in a method for presenting a contextual new tab in a heterogeneous tab environment in accordance with one or more embodiments.

FIG. 5 is a flow diagram that describes steps in a method for presenting a contextual new tab in a heterogeneous tab environment in accordance with one or more implementations. In at least some implementations, the method can be performed at least in part at the client device 102, e.g., by the contextual information module 116 and/or the tab environment module 108.

Step 500 receives a request to launch a new tab in a heterogeneous tab environment. The user 118, for instance, interacts with the client device 102 to perform an action to initiate launching the new tab 302 in the tab environment 110. An example of such an action includes selecting the new tab control 128 in the tab environment 110 via the input mechanisms 114 of the client device 102. In at least some implementations, an input is received by the tab environment module 108 indicating the request to launch the new tab 302.

Step 502 determines relevant content for progressing to a likely subsequent step of a current task identified based on contextual information collected from the tabs which are currently presented in the heterogeneous tab environment. The contextual information 120 is collected and processed by the contextual information module 116. Based on the contextual information 120, the contextual information module 116 identifies a likely current task associated with the tabs 122 that are currently presented in the tab environment 110. For instance, the contextual information module 116 collects the contextual information 120 from the tab environment module 108 regarding the applications 106 open in the tabs 122 via a call to the contextual APIs 216. According to various implementations, the contextual information module 116 determines the relevant content 204 based on the contextual information 120 and in accordance with the contextual information policies 124. The contextual information 120 associated with the user 118 may include prior and/or present activity, and interaction with the tab environment 110, the applications 106, the operating system 104, and so forth.

Step 504 launches the new tab in the heterogeneous tab environment configured to display the relevant content as visual representations each selectable to enable presentation of a respective instance of the relevant content in the new tab. In at least some embodiments, the new tab 302 is launched by the tab environment module 108. As detailed throughout, the new tab 302 is configured to present the relevant content 204 selectable for display in the tab environment 110. According to various implementations, the relevant content 204 may be presented as the visual representations 304 discussed above.

Figure 6:
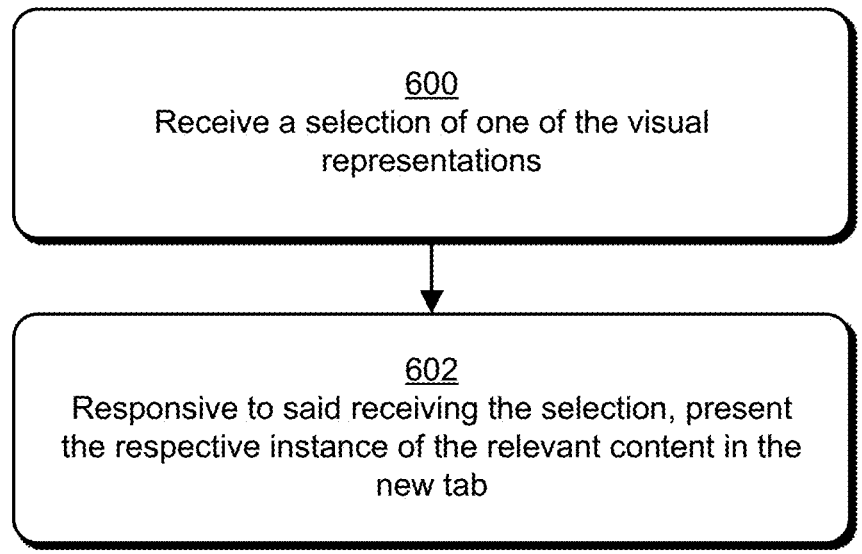
FIG. 6 is a flow diagram that describes steps in a method for presenting relevant content in a heterogeneous tab environment in accordance with one or more embodiments.

FIG. 6 is a flow diagram that describes steps in a method for presenting relevant content in a heterogeneous tab environment in accordance with one or more embodiments. In at least some implementations, the method can be performed at least in part at the client device 102, e.g., by the tab environment module 108.

Step 600 receives a selection of one of the visual representations. For instance, the tab environment module 108 receives an input indicating selection of one of the visual representations 304 via the input mechanisms 114 of the client device 102.

Responsive to receiving the selection, step 602 presents the respective instance of the relevant content in the new tab. In at least some implementations, the relevant content 204 is presented in the tab environment 110 in the new tab 302. Generally, the tab environment module 108 causes presentation of the relevant content 204 responsive to said receiving the selection of one of the visual representations 304. As described above, the relevant content 204 may not be available for local execution on the client device 102 because, for example, the relevant content 204 is an application which has not been downloaded or installed on the client device 102. In such a scenario, the tab environment module 108 may cause initiation of download and/or installation of the relevant content 204 (or a dependency of the relevant content 204) for presentation in the tab environment 110.

Figure 7:
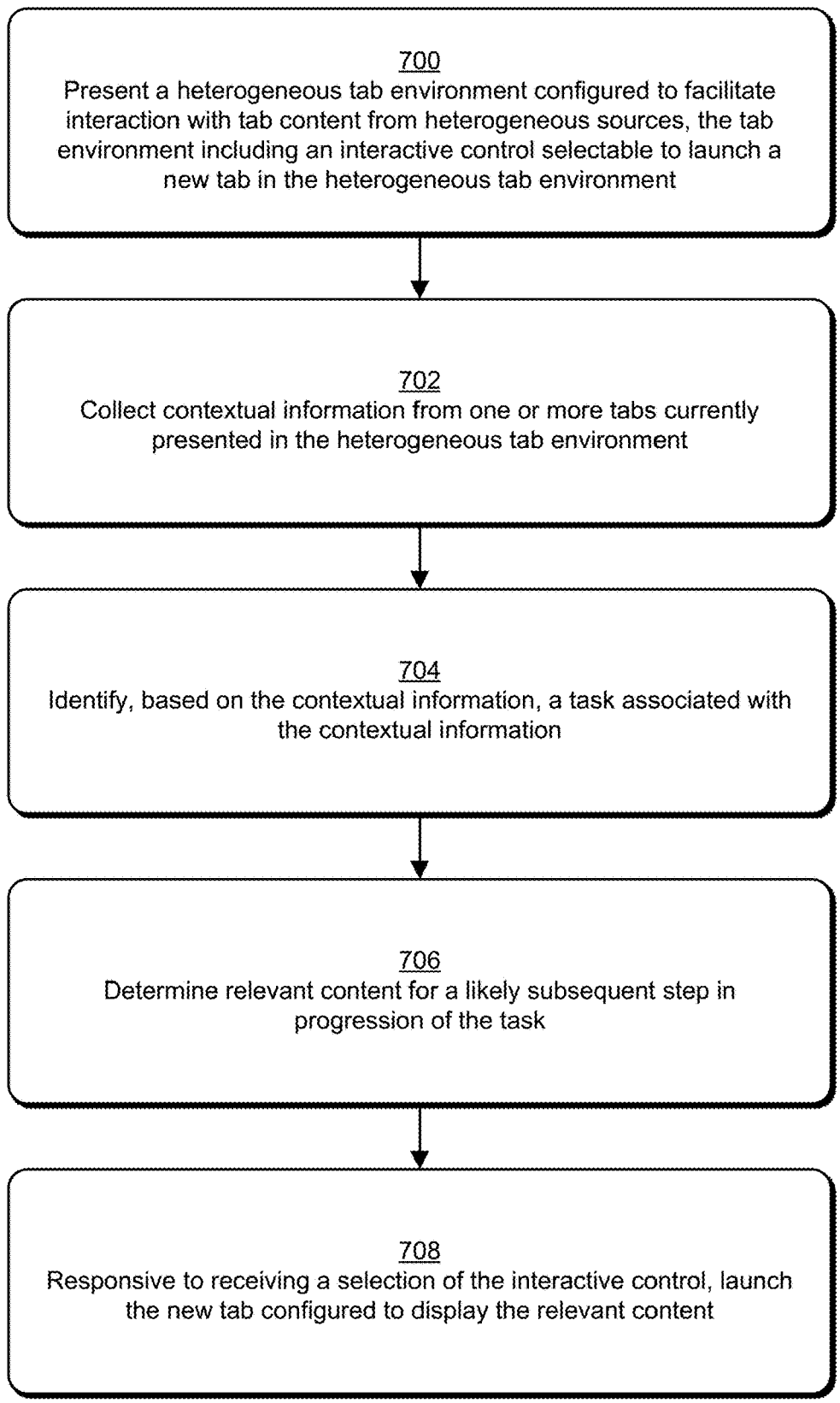
FIG. 7 is a flow diagram that describes steps in a method for presenting relevant content in a new tab in accordance with one or more embodiments.

FIG. 7 is a flow diagram that describes steps in a method for presenting relevant content in a new tab in accordance with one or more embodiments. In at least some implementations, the method can be performed at least in part at the client device 102, e.g., by the tab environment module 108 and/or the contextual information module 116.

Step 700 presents a heterogeneous tab environment configured to facilitate interaction with tab content from heterogeneous sources, the tab environment including an interactive control selectable to launch a new tab in the heterogeneous tab environment. The tab environment 110, for instance, is presented on the GUI 126 by the tab environment module 108. In various implementations, the tab environment 110 includes the new tab control 128 selectable to launch the new tab 302.

Step 702 collects contextual information from one or more tabs currently presented in the heterogeneous tab environment. According to carious implementations, the contextual information module 116 collects the contextual information 120 related to the user 118 from one or more of the contextual sources 202, such as the user profile 208, the tab environment module 108, the contextual APIs 216, and the task database 206.

Generally, the contextual information module 116 can collect the contextual information 120 in various ways. For instance, the contextual information 120 can be based on data types identified in metadata from the contextual sources 202, application types for applications 106 that are active in one or more currently active tabs (e.g., the tabs 122), keyword recognition from content presented by the contextual sources 202, and so forth.

Step 704 identifies, based on the contextual information, a task associated with the contextual information. The contextual information module 116 may use past and present activities of the user 118 to predict the current task of the user 118. For instance, the contextual information module may determine a strength of a correlation between instances of the contextual information 120 obtained from the tab environment module 108 and instance of the contextual information 120 obtained from the task database 206. In this way, the contextual information module 116 determines the current task of the user 118 in the context of the tab environment 110.

Step 706 determines relevant content for a likely subsequent step in progression of the task. For instance, the contextual information module 116 determines the next likely steps in progressing the present task and calls the contextual APIs 216 to obtain application features and content from the applications 106 that relate to the task. According to various implementations, the contextual information module 116 collects at least part of the contextual information 120 from the task database 206 or the crowdsourced database 214 and uses the contextual information 120 to determine the task in which the user 118 is engaged. The relevant content 204 is determined by the contextual information module 116 based on the contextual information 120 and the content available to the tab environment 110.

Responsive to receiving an input at the interactive control, step 708 launches the new tab configured to display the relevant content. In at least some implementations, the new tab 302 is launched responsive to receiving an input from the new tab control 128. As detailed throughout, the new tab 302 is configured to present the relevant content 204 selectable for display in the tab environment 110. In this way, the contextual information module 116 enables the user 118 to interact with the relevant content 204 for the present task in a single interface, e.g., the tab environment 110.

Figure 8:
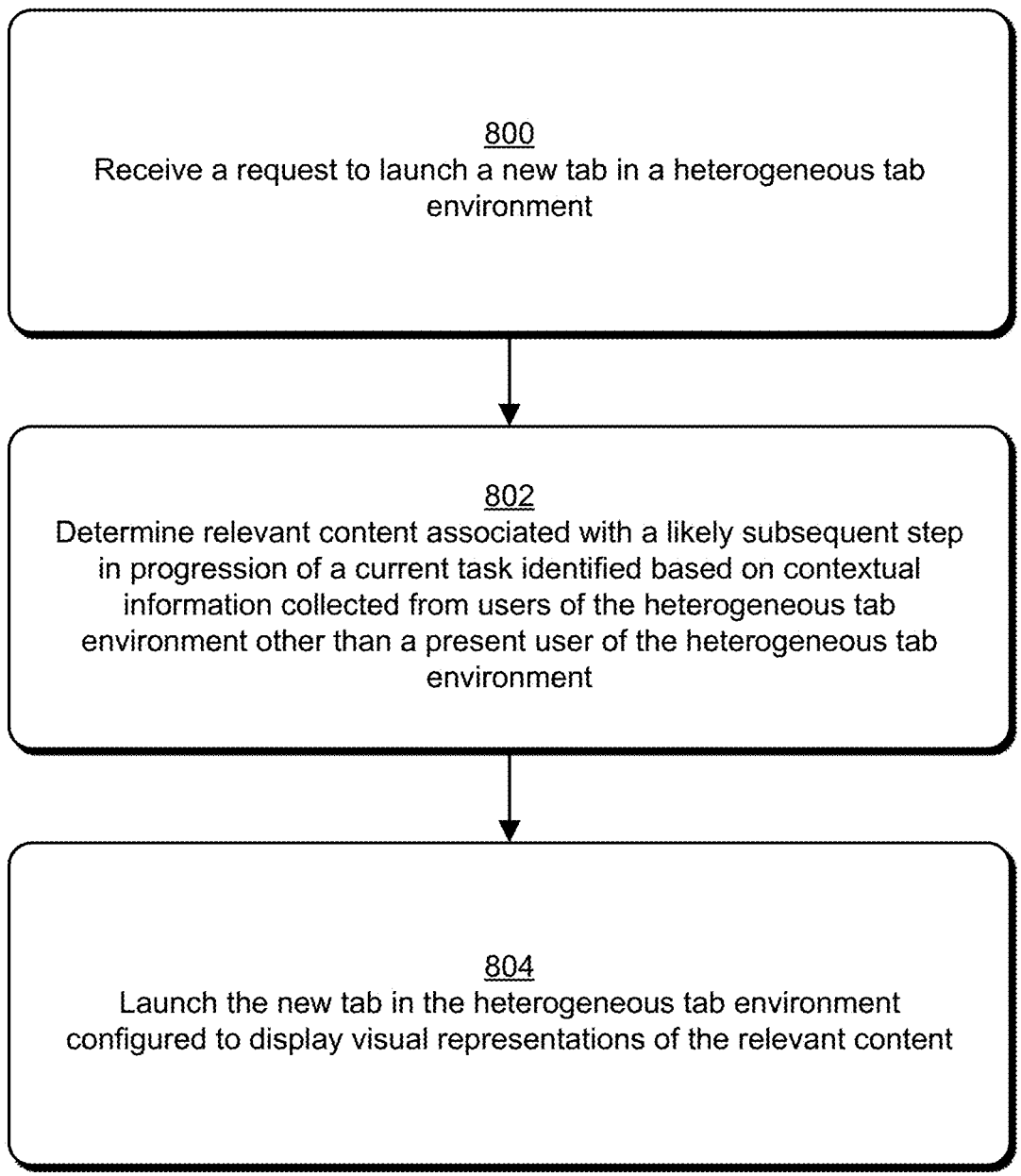
FIG. 8 is a flow diagram that describes steps in a method for presenting a contextual new tab in a heterogeneous tab environment in accordance with one or more embodiments.

FIG. 8 is a flow diagram that describes steps in a method for presenting a contextual new tab in a heterogeneous tab environment in accordance with one or more embodiments. In at least some implementations, the method can be performed at least in part at the client device 102, e.g., by the tab environment module 108 and/or the contextual information module 116.

Step 800 receives a request to launch a new tab in a heterogeneous tab environment. In some implementations, the tab environment module 108 receives an input indicating that the user 118 would like to launch the new tab 302 in the tab environment 110. An example of such an action includes selecting the new tab control 128 in the tab environment 110.

Step 802 determines relevant content associated with a likely subsequent step in progression of a current task identified based on contextual information collected from users of the heterogeneous tab environment other than a present user of the heterogeneous tab environment. For instance, the contextual information 120 is obtained from the contextual sources 202, such as the crowdsourced database and the task database 206, and analyzed as described above to determine the relevant content 204 for the present task. The contextual information 120 may be collected from local sources and/or from remotes sources over the network 210, e.g., via the network sources 212. Generally, the contextual information 120 collected from the instance of the tab environment 110 includes content and metadata collected from the tabs 122 presently open.

Step 804 launches the new tab in the heterogeneous tab environment configured to display visual representations of the relevant content. As detailed throughout, the new tab 302 is configured to present the relevant content 204 selectable for display in the tab environment 110. According to various implementations, the relevant content 204 may be presented as the visual representations 304, e.g., preview images of the relevant content 204.

Having described some example procedures, consider now an example system and device on which the various implementation scenarios and procedures may be implemented.

Figure 9:
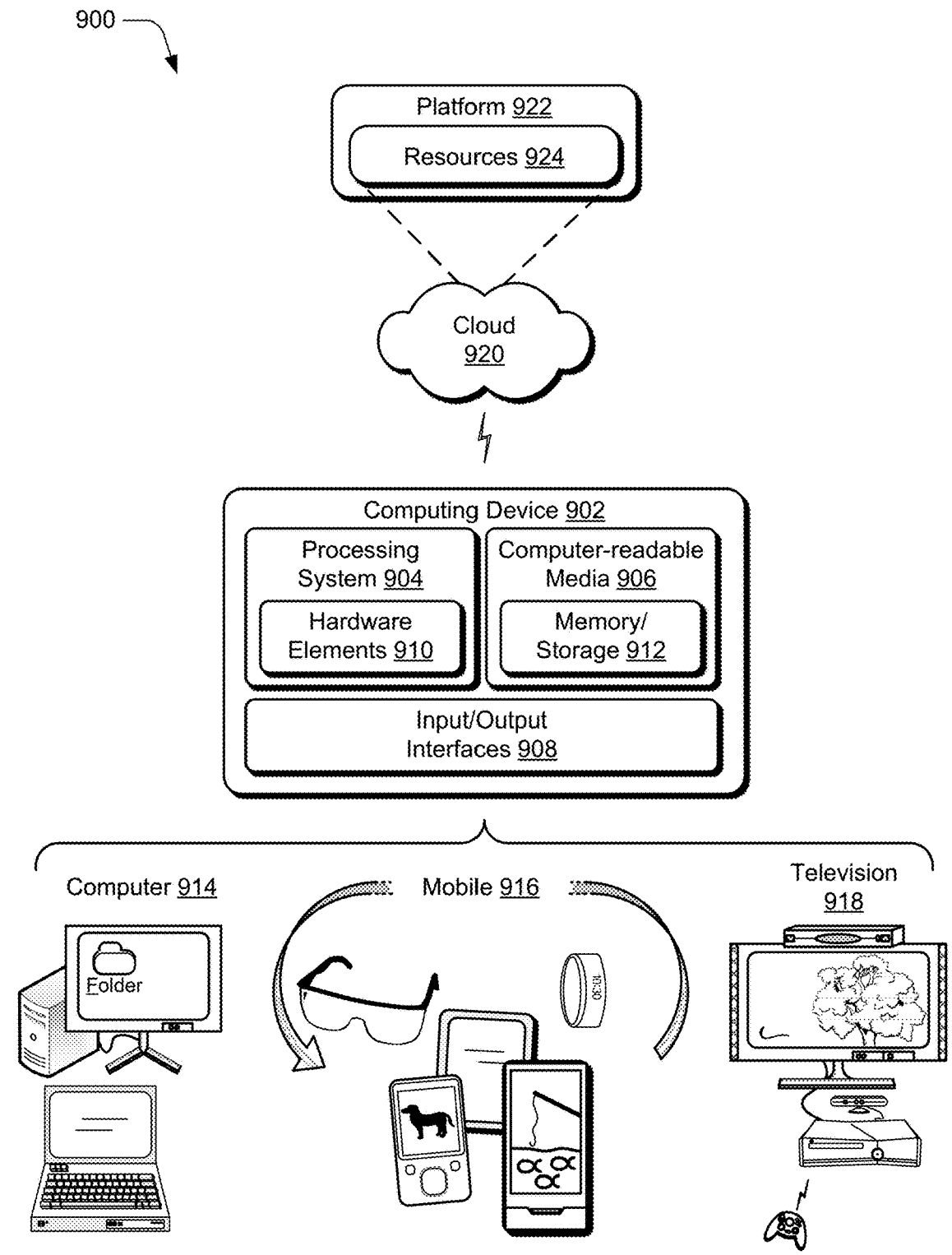
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, the client device 102 discussed above with reference to FIG. 1 can be embodied as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for displaying relevant content for a task in a tab environment, the system comprising: at least one processor; and one or more computer-readable storage media including instructions stored thereon that, responsive to execution by the at least one processor, cause the system to perform operations including: receiving a request to launch a new tab in a heterogeneous tab environment; determining relevant content for progressing to a likely subsequent step of a current task identified based on contextual information collected from tabs which are currently presented in the heterogeneous tab environment; and launching the new tab in the heterogeneous tab environment configured to display the relevant content as visual representations each selectable to enable presentation of a respective instance of the relevant content in the new tab.

In addition to any of the above described systems, any one or combination of: wherein the operations further include receiving a selection of one of the visual representations and responsive to said receiving the selection, presenting the respective instance of the relevant content in the new tab; wherein the contextual information includes information regarding content presented previously in the heterogeneous tab environment; wherein the contextual information includes information regarding a present user of the heterogeneous tab environment; wherein the contextual information includes metadata associated with content currently presented in the tabs of the heterogeneous tab environment; wherein the visual representations comprise preview images of the relevant content; wherein the contextual information includes information indicating tasks previously performed by a present user of the heterogeneous tab environment; wherein the contextual information includes a user profile for a present user of the heterogeneous tab environment including data indicating prior interaction by the user with content including interaction by the user with at least an application or a service; wherein at least some of the contextual information is collected by an application programming interface (API); wherein said determining the relevant content further comprises ranking the relevant content based on correlation to the likely current task and wherein the visual representations are displayed in an order based on said ranking; and wherein the relevant content includes an application or a service which is not currently locally executable on a client device, and wherein a selection of a visual representation that represents the application or the service which is not currently locally executable causes the system to further perform operations including initiating an installation of a local instance of the application or the service.

A computer-implemented method for displaying relevant content for a task in a tab environment, the method comprising: presenting a heterogeneous tab environment configured to facilitate interaction with tab content from heterogeneous sources, the tab environment including an interactive control selectable to launch a new tab in the heterogeneous tab environment; collecting contextual information from one or more tabs currently presented in the heterogeneous tab environment; identifying, based on the contextual information, a task associated with the contextual information; determining relevant content for a likely subsequent step in progression of the task; and responsive to receiving a selection of the interactive control, launching the new tab configured to display the relevant content.

In addition to any of the above described systems, any one or combination of: the method further comprising receiving an input indicating a selection of an instance of the relevant content, and presenting the selected instance of the relevant content in the new tab; and wherein the contextual information further includes metadata associated with content from the tabs currently presented in the heterogeneous tab environment.

A computer-implemented method for displaying relevant content for a task in a tab environment, the method comprising: receiving a request to launch a new tab in a heterogeneous tab environment; determining relevant content associated with a likely subsequent step in progression of a current task identified based on contextual information collected from users of the heterogeneous tab environment other than a present user of the heterogeneous tab environment; and launching the new tab in the heterogeneous tab environment configured to display visual representations of the relevant content.

In addition to any of the above described systems, any one or combination of: the method further comprising receiving an input indicating a selection of one of the visual representations, and presenting, in the new tab, the relevant content associated with the selected one of the visual representations; wherein the contextual information further includes information collected from one or more tabs currently presented in the heterogeneous tab environment, and wherein said determining the relevant content further comprises determining a similarity between the contextual information collected from the one or more tabs currently presented and the contextual information collected from the users of the heterogeneous tab environment other than the present user of the heterogeneous tab environment; wherein said receiving the request to launch the new tab comprises a hover action over an interactive new tab control and the relevant content is presented in a pop-up element responsive to said receiving the hover action; wherein the contextual information further includes environmental awareness data; and wherein an instance of the relevant content comprises an application or a service which is not currently locally executable and wherein the operations further include: receiving a selection of the application or the service which is not currently locally executable, and initiating a local installation of the application or the service to enable presentation of the application or the service in the new tab.

Techniques for a contextual new tab experience are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
  at least one processor; and
  one or more computer-readable storage media including instructions stored thereon that, responsive to execution by the at least one processor, cause the system to perform operations including:
  identifying that a browser window is a heterogeneous tab environment based on a collection of contextual information from tabs that are currently presented in the browser window, wherein the identifying comprises analyzing the contextual information to detect similarities between content in the tabs that are currently presented;
  receiving a request to launch a new tab in the browser window; in response to identifying that the browser window is the heterogeneous tab environment, determining relevant content for progressing to a likely subsequent step of a current task identified for the heterogeneous tab environment, wherein said determining of the relevant content comprises ranking the relevant content based on the current task and the analyzed contextual information; and said determining of the relevant content further comprises ranking the relevant content based on the current task associated with the heterogeneous tab environment
updating the heterogeneous tab environment by launching the new tab in the browser window, wherein the new tab comprises visual representations of the determined relevant content that are each selectable to enable presentation of a respective instance of the determined relevant content in the new tab.

2. The system as described in claim 1, the operations further including: receiving a selection of one of the visual representations; and responsive to said receiving the selection, presenting the respective instance of the determined relevant content in the new tab.

3. The system described in claim 1, wherein the contextual information further comprises information regarding a present user of the heterogeneous tab environment.

4. The system described in claim 1, wherein the contextual information further comprises metadata associated with content currently presented in the tabs of the heterogeneous tab environment.

5. The system described in claim 1, wherein the visual representations comprise preview images of the determined relevant content.

6. The system described in claim 1, wherein the contextual information further comprises information indicating tasks previously performed by a present user of the heterogeneous tab environment.

7. The system described in claim 1, wherein the contextual information further comprises a user profile for a present user of the heterogeneous tab environment including data indicating prior interaction by the present user with content including interaction by the present user with at least an application or a service.

8. The system described in claim 1, wherein said determining of the relevant content further comprises ranking the relevant content based on a current task associated with a state of the heterogeneous tab environment, wherein the current task is determined based on a correlation of the detected similarities between the content in the tabs and a task prediction for the current task, and wherein the visual representations are displayed in an order based on said ranking.

9. The system described in claim 1, wherein the relevant content includes an application or a service which is not currently locally executable on a client device, and wherein a selection of a visual representation that represents the application or the service, which is not currently locally executable, causes the system to further perform operations including initiating an installation of a local instance of the application or the service.

10. A computer-implemented method, comprising:
  identifying that a browser window is a heterogeneous tab environment based on a collection of contextual information from tabs that are currently presented in the browser window, wherein the identifying comprises analyzing the contextual information to detect similarities between content in the tabs that are currently presented;
  identifying, based on the contextual information, a task associated with the contextual information;
  in response to identifying that the browser window is the heterogeneous tab environment, determining relevant content for progressing to a likely subsequent step of a current task identified for the heterogeneous tab environment, wherein said determining of the relevant content comprises ranking the relevant content based on the current task and the analyzed contextual information; and updating the heterogeneous tab environment by launching a new tab in the browser window, wherein the new tab comprises one or more visual representations of the determined relevant content.

11. The method described in claim 10, further comprising:

receiving an input indicating a selection of the one or more visual representations of the determined relevant content; and presenting a selected instance of content in the new tab based on the received input.

12. A computer-implemented method, comprising:

identifying that a browser window is a heterogeneous tab environment based on a collection of contextual information from tabs that are currently presented in the browser window, wherein the identifying comprises analyzing the contextual information to detect similarities between content in the tabs that are currently presented;

receiving a request to launch a new tab in the browser window;

in response to identifying that the browser window is the heterogeneous tab environment, determining relevant content for progressing to a likely subsequent step of a current task identified for the heterogeneous tab environment, wherein said determining of the relevant content comprises ranking the relevant content based on the current task and the analyzed contextual information; and updating the heterogeneous tab environment by launching the new tab in the browser window, wherein the new tab comprises one or more visual representations of the determined relevant content that are each selectable to enable presentation of a respective instance of the determined relevant content in the new tab.

13. The method described in claim 12, further comprising:

receiving an input indicating a selection of the one or more visual representations of the determined relevant content; and presenting a selected instance of content in the new tab based on the received input.

14. The method described in claim 12, wherein said receiving the request to launch the new tab comprises a hover action over an interactive new tab control and the determined relevant content is presented in a pop-up element responsive to said receiving the hover action.

15. The method described in claim 12, wherein an instance of the determined relevant content comprises an application or a service which is not currently locally executable and wherein the operations further include: receiving a selection of the application or the service which is not currently locally executable; and initiating a local installation of the application or the service to enable presentation of the application or the service in the new tab.

16. The system described in claim 1, wherein the request to launch the new tab is a selection of a user interface icon, within the browser window, configured for launch of a blank tab in the browser window.

17. The method described in claim 10, wherein the request to launch the new tab is a selection of a user interface icon, within the browser window, configured for launch of a blank tab in the browser window.

18. The method described in claim 10, wherein the current task is determined based on a correlation of the detected similarities between the content in the tabs and a task prediction for the current task, and wherein the visual representations are displayed in an order based on said ranking.

19. The method described in claim 12, wherein the request to launch the new tab is a selection of a user interface icon, within the browser window, configured for launch of a blank tab in the browser window.

20. The method described in claim 12, wherein the current task is determined based on a correlation of the detected similarities between the content in the tabs and a task prediction for the current task, and wherein the visual representations are displayed in an order based on said ranking.

* * * * *